Nov. 6, 1928.  
W. O. VIVARTTAS  
1,690,145  
MOLDING MACHINE  
Filed March 24, 1924  3 Sheets-Sheet 3

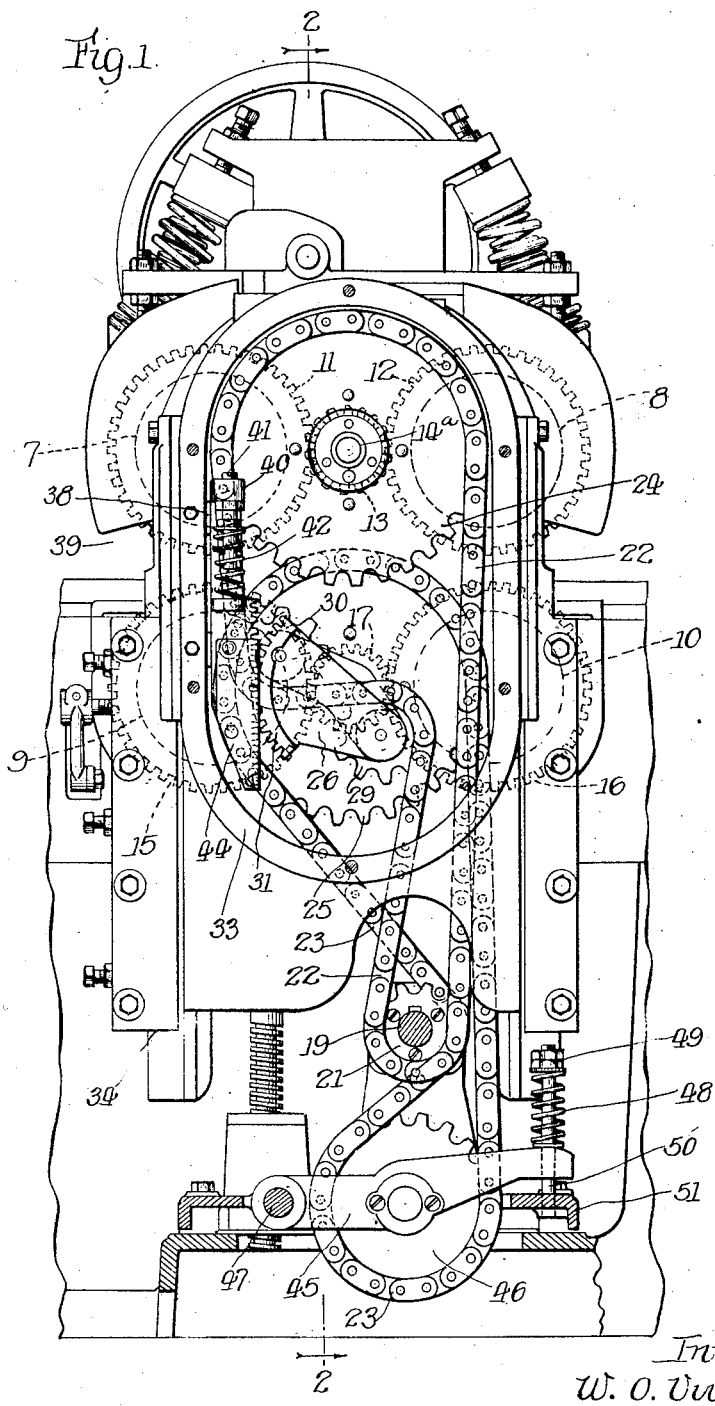

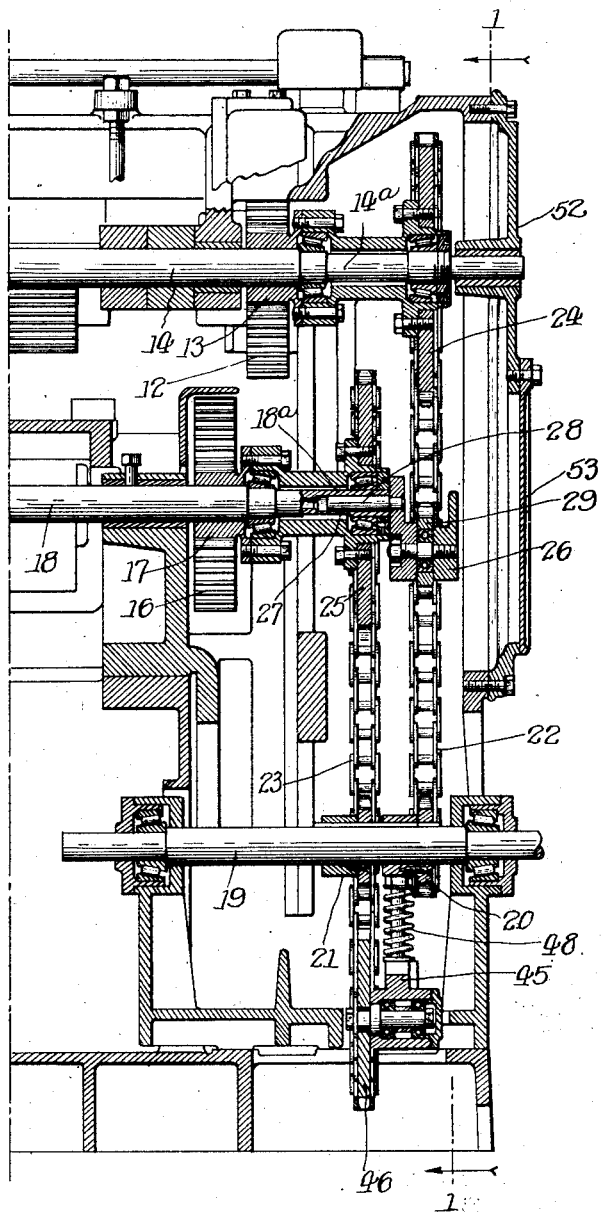
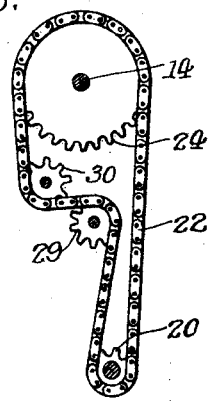
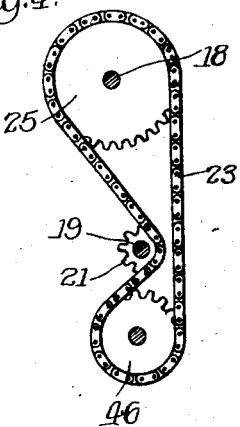

Patented Nov. 6, 1928.

1,690,145

UNITED STATES PATENT OFFICE.

WILLIAM O. VIVARTTAS, OF ROCKFORD, ILLINOIS, ASSIGNOR TO MATTISON MACHINE WORKS, OF ROCKFORD, ILLINOIS, A CORPORATION OF ILLINOIS.

MOLDING MACHINE.

Application filed March 24, 1924. Serial No. 701,277.

The invention pertains to wood-working machines of the type commonly designated molders, and it has especial reference to the means for driving the feed rolls.

It is common practice to employ in molding machines of the character indicated a chain drive for operating the feed rolls. Difficulty has been experienced, however, with such drive means because of a tendency of the chain drive as ordinarily constructed and arranged to impart an intermittent movement to the rolls as distinguished from a smooth continuous motion, with the result that the work which is fed by the rolls into engagement with the cutter head is not fed at a smooth and constant speed. The object of this invention is to provide a chain drive for the feed rolls of a molding machine which is capable of overcoming the difficulty referred to.

In the accompanying drawings wherein I have shown my invention as applied to a molding machine of preferred construction, Figure 1 is a transverse vertical sectional view through one end of the machine taken approximately in the plane of line 1—1 of Fig. 2.

Fig. 2 is a longitudinal vertical sectional view taken approximately in the plane of line 2—2 of Fig. 1.

Fig. 3 is a detached view illustrating the drive chain for the upper set of feed rolls.

Fig. 4 is a similar view showing the chain drive for the lower set of feed rolls.

Figure 5:
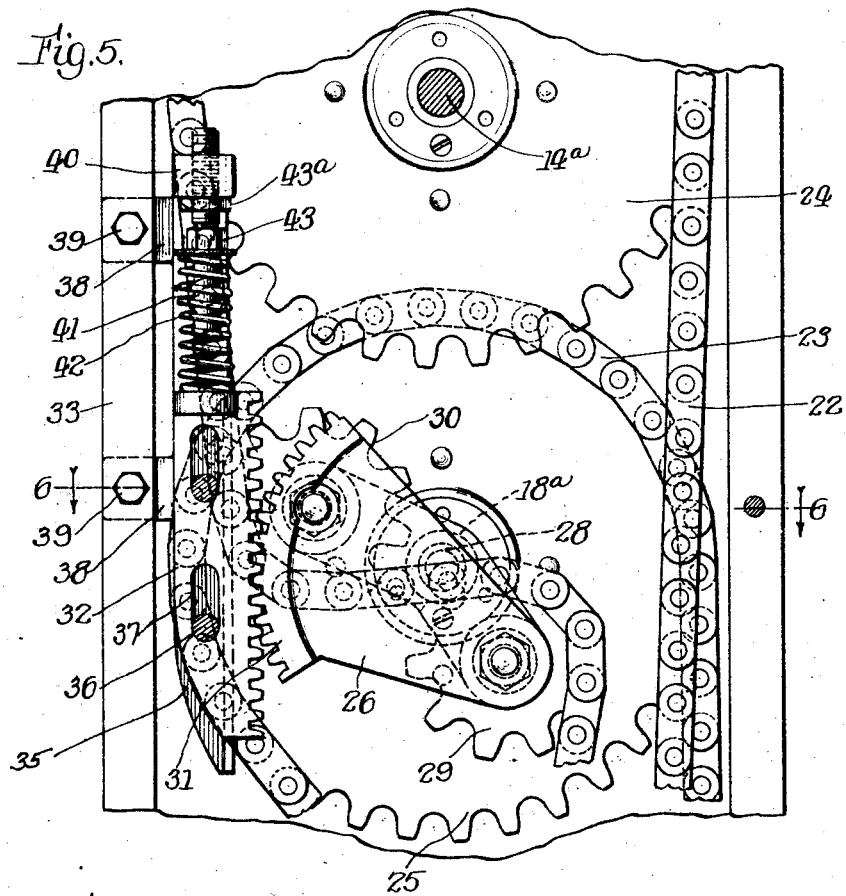
Fig. 5 is a fragmentary end view on an enlarged scale of parts shown in Fig. 1 adapted to effect the smooth operation of the upper feed rolls.

The molding machine which I have selected for purposes of illustration comprises two sets of feed rolls including an upper pair of rolls 7 and 8 and a lower set of rolls 9 and 10. The rolls 7 and 9 may, for convenience, be termed the forward rolls of the respective sets and the rolls 8 and 10 the rear rolls. The several rolls are suitably journaled in the machine and the rolls of each set are geared together for operation in unison. Herein the upper rolls 7 and 8 are connected together by means of gears 11 and 12 rigid therewith, with an intermediate pinion 13 therebetween which is mounted upon a drive shaft 14 having an extended end portion 14$^a$ for driving purposes. The lower rolls are similarly connected by spur gears 15 and 16 rigid with the respective rolls and an intermediate driving pinion 17 mounted on a shaft 18 disposed directly below the shaft 14 and having an extended end portion 18$^a$ also for driving purposes.

The shafts 14 and 18 are arranged to be driven from a drive shaft 19 connected with a suitable source of power and supported in the machine frame parallel to but spaced a substantial distance below the shaft 18. Rigid with said shaft is a pair of sprocket gears 20 and 21. Over these gears run chains 22 and 23 which also pass over sprocket gears 24 and 25 upon the end portions 14$^a$ and 18$^a$ of the shafts 14 and 18 respectively.

The shaft 14 and rollers 7 and 8 are mounted for vertical adjustment as is common in machines of this type so as to accommodate between the upper and lower rolls work of varying thicknesses. To permit of such vertical adjustment without necessitating an alteration in the chain, I provide an automatic take-up means which constitutes at the same time a means for absorbing the shocks incident to the passage of the chain over the sprocket gears, thus tending to produce a smooth and continuous operation of the feed rolls. This means comprises (Fig. 5) a rocker arm 26 pivoted between its ends on the projecting end portion 18$^a$ of the shaft 18, said end portion being provided for this purpose with a bore 27 adapted to receive a pivot pin 28 upon which the arm is adapted to turn. One end of said arm has mounted thereon an idler sprocket gear 29 and the opposite end of the arm carries a similar idler 30. A segment 31 formed on the arm 26 is arranged to mesh with a rack 32 which is secured to a housing 33. The latter also carries the upper feed rolls and is mounted for up and down movement in ways 34 (Fig. 1).

Figure 6:
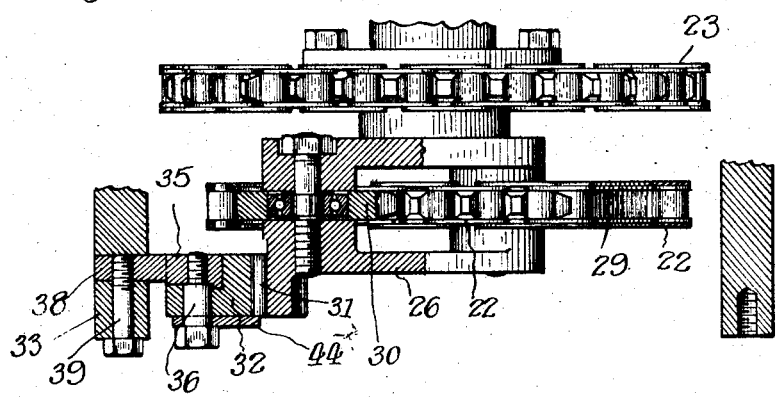
Fig. 6 is a horizontal section taken in the plane of line 6—6 of Fig. 5.

The rack bar is in the present instance shown as being secured to the housing by means of a supporting bracket 35 to which the bar is slidably secured as by means of a pair of bolts 36 entered through slots 37 in the rack bar and anchored in the bracket 35. The latter has a pair of outward extending portions or lugs 38 whereby the plate may be secured to the housing 33 as by means of bolts 39. At the upper end of the bracket 35 is formed a lug 40 having a screw-threaded aperture therein in which is threaded the upper end of a guide stud 41 for a coiled compression spring 42. Said stud has an octagonal head 43 rigid therewith between which and the upper end of the rack bar bears the spring 42. The amount of pressure exerted by the spring 42 may thus be varied at will by adjusting the head 43. The stud 41 is locked in adjusted position by a nut 43ª engaging the under side of the lug 40. As shown in Figs. 1 and 6, a rack plate 44 may be secured by the bolts 36, on the forward face of the rack bar.

It will be seen that as the upper set of rolls 7 and 8 are moved vertically the rack bar 32 moving with the upper rolls imparts a swinging movement to the rocker arm 26 so as to cause it to compensate for any variation in the working length of the chain due to changes in the relative positions of the upper and lower rolls. Moreover, the tension of the spring 41 is adjusted so as to serve as an equalizer capable of absorbing any sudden shocks or unequal strains such as may be due to the increasing effectiveness of the radius of pull as the successive teeth become released from the chain. The result is that instead of an intermittent motion being imparted to the rolls by the chain drive, a smooth and continuous motion is imparted thereto. I may state that the effectiveness of the spring and associated parts as an equalizing means is readily apparent. upon an observation of the driving means in operation, from the fact that the rocker arm 26 undergoes a rapid vibratory oscillation constantly.

The chain drive for the lower set of rolls 9 and 10 is also provided with a shock absorbing means comprising in this instance a pivoted support or lever 45 which carries an idler gear 46 over which the chain 23 passes. The axis of the sprocket gear 21 mounted on the drive shaft 19 always bears a fixed relation to the axis of the gear 25 on the driven shaft 18 so that in this instance the shock absorbing means is located at the lower end of the chain loop. As herein shown, the lever 45 carrying the gear 46 is pivoted at one end as at 47 upon a fixed axis and its opposite end is held downward by means of a coiled spring 48 acting between adjusting nuts 49 at one end of a guide rod 50 and the free end of the lever. The rod 50 is suitably supported in a stationary part 51 on the machine frame. It will be evident that the tension on the spring 48 may also be readily adjusted so as to serve as an equalizer in the manner above set forth in connection with the chain 22, thus insuring the smooth operation of the lower feed rolls also.

As shown in Fig. 2, the shaft extension 14ª has a bearing at its free end in a removable cover plate 52 for the housing 33. The plate 52 is also apertured for convenient access to the interior of the housing, the aperture being closed by a second plate 53.

I claim as my invention:

1. In a molding machine, the combination of a feed roll, a support therefor, a drive shaft, said support being mounted for up and down movement relative to said shaft, means including a chain and sprocket mechanism for driving said roll, a rocker arm mounted to turn on a stationary axis and disposed between said roll and the drive shaft, a pair of idlers mounted on said arm and adapted to engage with said chain, and spring means tending to hold said idlers in engagement with the chain to maintain a predetermined tension thereon, said spring means being interposed between the rocker arm on the one hand and the movable support for the feed roll on the other hand.

2. In a molding machine, the combination of a feed roll, a drive shaft, said roll and shaft being mounted for relative movement toward and from each other, a chain and sprocket connection between said shaft and said roll, a rocker arm pivoted between its ends and having a pair of idlers engaging opposite sides of said chain, and means including a spring for causing said idlers to maintain the chain under a predetermined tension during a pivotal movement of said rocker arm.

3. In a molding machine, the combination of a feed roll, a drive shaft, said feed roll being adjustable relative to said drive shaft, means for driving the feed roll including a chain, and means for maintaining the chain under a predetermined tension including a rocker arm, a pair of idler gears on said arm and arranged to engage with the chain on opposite sides thereof, a segment rigid with said arm, a rack bar meshing with said segment, and spring means carried by the feed roll support engaging with said rack bar to actuate the rocker arm and cause the idler gears to tension the chain.

4. A molding machine comprising a pair of upper feed rolls and a pair of lower feed rolls mounted for relative adjustment, a drive shaft interposed between each of said pairs of rolls, a power driven shaft disposed below the lower feed rolls, each of said drive shafts having a sprocket gear thereon, a pair of sprocket pinions on the power driven shaft, chains connecting each of said pinions with the gears on the respective drive shafts, means interposed between the power driven shaft and the upper drive shaft for maintaining a predetermined degree of tension on the chain for the upper shaft while permitting of the adjustment of the upper rolls relative to the lower rolls, and means including an idler located below said power driven shaft for maintaining the chain for the lower rolls also under a predetermined degree of tension.

5. In a molding machine, the combination of upper and lower feed rolls, a drive shaft mounted to turn on a fixed axis, chain-driving means for the upper and lower rolls each arranged to be driven from said drive shaft, and means including adjustable resilient devices for maintaining a predetermined and constant tension upon the chains of each of said driving means, the tensioning means for one of the driving means being adapted to permit relative movement between the corresponding feed rolls and said drive shaft.

6. In a molding machine, the combination of upper and lower rolls mounted for relative adjustment toward and from each other, a drive shaft, and chain-driving means from said shaft to said rolls having spring tensioning means associated therewith adapted to permit of such relative movement between the upper and lower rolls and at the same time maintain the driving means under a constant predetermined tension, said spring tensioning means including a tension maintaining connection automatically operable upon relative movement of the rolls.

7. In a machine, the combination of a driven shaft, a drive shaft, supports for said shafts arranged to permit relative movement of one toward and from the other, drive means including a flexible connection between said shafts, a rocker arm pivoted to one of said supports and having a pair of idlers engaging said flexible connection, and a connection between said rocker arm and the other support including an adjustable spring tensioning device, said connection being arranged so as automatically to actuate said rocker arm upon relative movement between said supports and without changing the tension of said spring tensioning device.

In testimony whereof, I have hereunto affixed my signature.

WILLIAM O. VIVARTTAS.